United States Patent
Nakao et al.

(10) Patent No.: US 8,825,364 B2
(45) Date of Patent: Sep. 2, 2014

(54) VEHICLE POSITION RECOGNITION DEVICE AND VEHICLE POSITION RECOGNITION PROGRAM

(75) Inventors: Koichi Nakao, Okazaki (JP); Masaki Nakamura, Okazaki (JP); Tomoaki Ishikawa, Okazaki (JP); Motoki Kanba, Okazaki (JP); Osamu Aisaka, Okazaki (JP)

(73) Assignee: Aisin AW Co., Ltd., Aichi (JP)

( * ) Notice: Subject to any disclaimer, the term of this patent is extended or adjusted under 35 U.S.C. 154(b) by 1599 days.

(21) Appl. No.: 12/213,040

(22) Filed: Jun. 13, 2008

(65) Prior Publication Data
US 2009/0005979 A1 Jan. 1, 2009

(30) Foreign Application Priority Data

Jun. 29, 2007 (JP) .................................. 2007-171891

(51) Int. Cl.
*G01C 21/30* (2006.01)

(52) U.S. Cl.
CPC ....................................... *G01C 21/30* (2013.01)
USPC ........... 701/210; 701/200; 701/201; 701/202; 701/205; 701/206; 701/209; 701/213; 701/214

(58) Field of Classification Search
USPC ......... 701/200, 201, 202, 205, 206, 207, 209, 701/210, 213, 214
See application file for complete search history.

(56) References Cited

U.S. PATENT DOCUMENTS

| 5,422,815 A | 6/1995 | Hijikata .......................... 364/449 |
| 2003/0023369 A1 | 1/2003 | Takashima ..................... 701/208 |
| 2003/0055558 A1* | 3/2003 | Watanabe et al. ............. 701/208 |

FOREIGN PATENT DOCUMENTS

| JP | 11-259794 | 9/1999 |
| JP | 11-325930 | 11/1999 |
| JP | 2001-227971 | 8/2001 |
| JP | 2002-341011 A | 11/2002 |
| JP | 2003-194558 | 7/2003 |
| JP | 2005-114535 | 4/2005 |
| JP | 2005-292082 | 10/2005 |
| JP | 2006-017644 | 1/2006 |
| JP | 2006-258656 | 9/2006 |
| JP | 2006-284254 | 10/2006 |
| JP | 2007-078519 | 3/2007 |

\* cited by examiner

*Primary Examiner* — Sean K Hunter
(74) *Attorney, Agent, or Firm* — Bacon & Thomas, PLLC (57) ABSTRACT

A vehicle location recognition apparatus includes a link determination unit which accurately determines a link traveled by a vehicle from among a plurality of links meeting at a narrow-angle branch point, on the basis of vehicle location information and road information, travel history information representing a route traveled by the vehicle at the branch point. The vehicle location recognition apparatus includes a history information generation unit for generating travel history information for the determined link. The travel history information is stored in a learning database. On the basis of the travel history information, a learning unit generates learned priority information representing the priorities of the respective links meeting at a branch point and used in the determination by the link determination unit.

9 Claims, 4 Drawing Sheets

VEHICLE POSITION RECOGNITION DEVICE AND VEHICLE POSITION RECOGNITION PROGRAM

INCORPORATION BY REFERENCE

The disclosure of Japanese Patent Application No. 2007-171891 filed on Jun. 29, 2007, including the specification, drawings and abstract thereof, is incorporated herein by reference in its entirety.

BACKGROUND

1. Related Technical Fields

Related technical fields include a vehicle location recognition device for use in a navigation device or the like.

2. Description of the Related Art

Known navigation devices perform operations such as the display of vehicle location and guidance along a route to the destination by using road map data for actual roads. Such road map data is usually in the form of digital road network data for a combination of nodes and links. "Node" generally refers to a coordinate point representing an intersection or a curve in a road or the like. The respective nodes are connected by the links. Such connections of a plurality of links form a road network. Link information representing the attributes of the link is provided for each link. The link attributes include, for example, the link number, the coordinates of a start point node and an end point node of the link, the length (distance) of the link, the road type or class, the road width, the traffic regulations, and so forth.

The navigation apparatus obtains the location of its host vehicle in accordance with a method such as satellite navigation using a GPS (Global Positioning System) or autonomous navigation using an in-vehicle sensor and, based on the obtained information, locates the vehicle on a road map. At a narrow-angle branch point at which a road divides into branch roads at a relatively small angle, however, the vehicle may be located on a road different from the road where the vehicle is actually located due to an error in the satellite or autonomous navigation. When the navigation apparatus superimposes the vehicle location on a road map display, if the displayed vehicle location is different from the actual vehicle location, the driver may become confused.

To improve the accuracy of recognition of vehicle location at a narrow-angle branch point, Japanese Unexamined Patent Application Publication (Kokai)No. 2005-292082 (e.g., in paragraphs [0002] to [0012]) describes a technique for increasing the accuracy of location determination by a receiver of satellite signals. According to the disclosed technique, a high-accuracy location measurement unit would be used to reduce erroneous mapping due to error in the conventional measurement. Further, Japanese Unexamined Patent Application Publication No. 2006-017644 (e.g., in paragraphs [0016] to [0024]) describes a navigation apparatus which determines which one of branch roads is being traveled by the vehicle, on the basis of a threshold for the vehicle speed based on the speed limit of the branch road and signals from a direction indicator used to indicate an intention to change lanes.

A navigation apparatus conventionally provides other functions including guidance along the route to the destination and the provision of information relevant to the route. Information relevant to the route might include, for example, guidance to a rest area, guidance to a roadside station or a service area and guidance to the next interchange. If the destination has been input to the navigation apparatus, a route for the vehicle to the destination is determined by search. However, if a destination has not been input, a virtual destination area may be calculated in accordance with the direction of travel of the vehicle, and information for a route to the calculated virtual destination. In determining such a virtual destination area, if the route includes a branch point, it is difficult to predict for setting the virtual destination area ahead of the branch point. Japanese Unexamined Patent Application Publication (Kokai)No. 2006-284254 (e.g., paragraphs [0002] to [0007] and paragraphs [0043] to [0059]) proposes a course prediction method for predicting and presenting a course leaving the branch point, on the basis of the past history of the driver at the branch point. Based on the predicted course from the branch point, the virtual destination area is predicted, and information for guidance along the route to the predicted destination area is provided.

If the accuracy of the location determination at a narrow-angle branch point is increased as described in the aforementioned Japanese Kokai 2005-292082, erroneous mapping can be substantially reduced. However, the disclosed high-accuracy location measurement unit is expensive, and thus substantially increases the cost of the entire navigation apparatus. If the technique described in Japanese Kokai 2006-017644 is used, the accuracy of identifying the road, i.e., the link at the narrow-angle branch point, may be improved; however, the vehicle speed and the state of direction indicator, for example, in combination, will produce a variety of results, depending on the location of the branch point, the operation by the driver, and so forth. Further, the technique uses vehicle information different from that based on receipt of satellite signals or autonomous navigation and the operation of the navigation apparatus is thereby complicated.

The course prediction method described in Kokai 2006-284254 is a technique which predicts, as a probability based on past history, the route leaving the branch point before the vehicle reaches the branch point. That is, without tracing a travel route beyond the branch point, this course prediction method predicts the road leaving the branch point, i.e., the link to be actually traveled by the vehicle immediately beyond the branch point. Thus, there is no map matching with the predicted route beyond the branch point. Further, the necessity of such map matching is not recognized. Thus, the issue of map matching at a narrow-angle branch point still remains unresolved.

SUMMARY

Accordingly, an object of the present invention is to provide a vehicle location recognition apparatus capable of accurately determining links traveled by a vehicle from among a plurality of links branching at a branch point, particularly a narrow-angle branch point.

To achieve the above object, the present invention provides a vehicle location recognition apparatus which includes a vehicle location information acquisition unit, a road information acquisition unit, a link determination unit, a history information generation unit, a history information storage unit, and a learning unit. The vehicle location information acquisition unit acquires vehicle location information representing the current location of the host vehicle, i.e. the vehicle in which the apparatus is installed. The road information acquisition unit acquires road information representing connecting roads from among a plurality of links. The link determination unit determines, on the basis of the vehicle location information and the road information, the links traveled by the vehicle in departing (traveling beyond) the branch point. The history information generation unit generates, on the basis of the links determined by the link determination unit, travel history information representing a route taken by the vehicle at a branch point of the links. The history information storage unit stores the travel history information generated by the history information generation unit. The learning unit generates, on the basis of the travel history information stored in the history information storage unit, learned priority information representing the priorities of the respective links used in the determination by the link determination unit.

Accordingly, information for the route traveled by the vehicle in the past at the branch point of the links can be appropriately collected and stored as the travel history information. Further, on the basis of the thus stored travel history information, the learned priority information is generated to represent the priorities of the respective links used in the determination of the links traveled by the vehicle. Therefore, the link determination unit is able to make its determination in a manner reflecting the results of learning the route traveled by the vehicle in the past, with the use of the learned priority information. Accordingly, even if it is difficult to determine the links of a road being traveled by the vehicle solely from the vehicle location information and the road information obtained by GPS positioning or autonomous navigation, as at a narrow-angle branch point or the like, for example, the links traveled by the vehicle can be accurately identified from among the plurality of links branching at the branch point.

Further, in the vehicle location recognition apparatus the history information generation unit may limit storage of data for the route of the links determined by the link determination unit to a predetermined distance (route section) extending from the branch point.

Thus, in a preferred embodiment, the history information generation unit stores data for the links of a route over a predetermined distance from the branch point in generating the travel history information. If data for an unnecessarily long route section is stored, the amount of data for the travel history information is unnecessarily increased, and thus the history information storage unit requires a large capacity. If the range (distance from the branch) of the links to be stored is specified, as in a preferred embodiment, the links determined by the link determination unit can be efficiently stored without waste of storage capacity.

Further, the vehicle location recognition apparatus may generate learned priority information on the basis of ratios of number of times the vehicle has traveled each of the links branching at the branch point.

Thus, the priorities based on the ratios of times traveled at the branch point are biased for a frequently used road. By applying such a bias, the links traveled by the vehicle can be accurately identified from among the plurality of links branching at the branch point.

Further, in the vehicle location recognition apparatus according to the latter embodiment, the link determination unit determines the links traveled by the vehicle using the learned priority information, thereby making a determination which reflects the results of learning the routes traveled by the vehicle in the past. Accordingly, even if it is difficult to identify the links of a road being traveled by the vehicle solely from the vehicle location information and the road information obtained by GPS positioning or autonomous navigation, as at a narrow-angle branch point or the like, for example, it is possible to improve the accuracy of determination of the links traveled by the vehicle, from among the plurality of links branching at the branch point.

Alternatively or additionally, the vehicle location recognition apparatus may include a general-purpose priority information acquisition unit for acquiring general-purpose priority information based on attributes of the roads of the respective branching links. Thus, the vehicle location recognition apparatus may determine the links traveled by the vehicle using the learned priority information in addition to or instead of the general-purpose priority information.

At a branch point of a road that is not (or has not been) frequently traveled, the link determination is based solely on use of the general-purpose priority information, i.e. the links traveled are identified based on the attributes (general conditions) of the road. Conversely, at a branch point of a frequently used road, the link determination (identification) may be made using solely the learned priority information generated on the basis of the travel history of the vehicle. In other words, if the learned priority information is used instead of the general-purpose priority information, the determination of the links traveled by the vehicle can be made on the basis of the travel history of the vehicle, excluding the influence of the general conditions. If the learned priority information is used in addition to the general-purpose priority information, the link determination can be performed in a multifaceted manner taking into consideration both types of priority information.

Further, the vehicle location information acquisition unit may be used to correct the vehicle location information on the basis of its determination of the links traveled by the vehicle.

There are a variety of ways to acquire the vehicle location information. In autonomous navigation, the current location of the vehicle is determined on the basis of the travel distance and the direction of travel of the vehicle, with the immediately preceding location of the vehicle used as a reference. In this case, if there is a deviation in the vehicle location information, the deviation will gradually increase. However, this incremental increase in error of the vehicle location information can be corrected on the basis of the results of the identification of the traveled links determined by the link determination unit. Thus, the accuracy of the vehicle location information can be improved.

As noted above, the vehicle location information is acquired on the basis of satellite signals or autonomous navigation. At a narrow-angle branch point at which a road divides into branch roads with a relatively small angle between them, the vehicle location information may be applicable to a plurality of these links due to an error or inaccuracy in the satellite or autonomous navigation. Accordingly, the link determination unit determines the links traveled by the vehicle by reference to the learned priority information generated in accordance with the travel history. Therefore, even if it is difficult to determine the link of the road traveled by the vehicle in departing the branch point, from the vehicle location information and the road information obtained by GPS positioning or autonomous navigation, particularly at a narrow-angle branch point or the like, it is still possible to improve the accuracy of the determination of the route (link) traveled by the vehicle from among a plurality of branching links.

The terminology "narrow-angle branch point", as used herein, refers to a branch point where a road branches and the branches extend from the branch point with a small angle therebetween, which makes it difficult for a direction sensor to determine which branch has been taken from the branch point, e.g., a branch point having an angle of 45 degrees or less.

The history information generation unit determines, on the basis of the link identified by the link determination unit, the route actually traveled by the vehicle at the branch point, and generates travel history information representing the actually traveled route.

If the travel history information includes a movement between links which are mutually discontinuous in the road information, a so-called "jump in location" has occurred. In this case, it is assumed that the links determined immediately after passing through the branch point have been erroneously identified. If the link identification is corrected, the route actually traveled by the vehicle can be determined. The apparatus according to one embodiment determines the route actually traveled by the vehicle at the branch point of the links, and generates travel history information representing the actually traveled route. The history information storage unit stores the travel history information for the actually traveled route. Accordingly, the learning unit can generate the learned priority information with a minimum computational load.

The history information generation unit may generate the travel history information representing the route in accordance with the order of the links determined by the link determination unit.

In such an embodiment, if the travel history information includes a movement between links which are mutually discontinuous in the road information, it is assumed that a so-called "jump in location" has occurred and the history information generation unit generates the travel history in accordance with the order of the links determined by the link determination unit, irrespective of the presence or absence of such a "jump in location." However, if the travel history information includes a movement between the mutually discontinuous links in the road information, it is possible to determine the route actually traveled by the vehicle, including determination of the presence or absence of a "jump in location," on the basis of the travel history information. Accordingly, the learning unit can generate the learned priority information for that route actually traveled by the vehicle.

The jump in location may occur as a movement from one of the links represented by the travel history information to another link not in connection with that one link in the road information.

If the road (links) section is set unnecessarily long, the amount of data of the travel history information is unnecessarily increased, and the history information storage unit requires an unnecessarily large capacity. If a jump in location occurs, the actual travel route at the branch point can be determined. Therefore, if the storage section set as the section in which a jump in location occurs, that section is sufficient to acquire an appropriate amount of travel history information.

Further, in the vehicle position recognition apparatus according to the above embodiment the storage section may be set to extend from the subject branch point to the next branch point in the direction of movement of the vehicle.

If the storage section is set to be unnecessarily long, the amount of travel history information (data) is thereby increased, and the history information storage unit requires a large capacity. The travel history information is generated with the branch point set as a starting point. Thus, if the travel history information is generated beyond the branch point, the result is the storing of overlapping sections. Accordingly, in one embodiment, the storage section is set to extend up to the next branch point and no further. Accordingly, it is possible to secure a section providing an appropriate amount of travel history information.

A navigation apparatus includes the vehicle location recognition apparatus described above, a road information storage unit, a plurality of application programs, and a guidance information output unit. The road information storage unit stores the road information. The application programs are executed with reference to the vehicle location information recognized by the vehicle location recognition unit and the road information. The guidance information output unit operates in accordance with the application programs to output guidance information.

The application programs can be executed on the basis of the links determined by use of the learned priority information. Therefore, it is possible to provide accurate guidance information on the basis of the links traveled by the vehicle, which have been accurately determined at a branch point, even at a narrow-angle branch point. For example, it is possible to reduce the jumps in location at the branch point, particularly at a narrow-angle branch point, to thereby provide an improved navigation apparatus.

The present invention also provides a computer-read medium encoded with a vehicle location recognition program, which program causes a computer to operate as a vehicle location recognition apparatus by execution of a method comprising a vehicle location information acquisition step, a road information acquisition step, a link determination step, a history information generation step, a history information storage step, and a learning step. In the vehicle location information acquisition step the vehicle location recognition apparatus acquires vehicle location information representing the current location of the vehicle. In the road information acquisition step the vehicle location recognition apparatus acquires road information representing roads connecting at a branch point. In the link determination step the vehicle location recognition apparatus determines, on the basis of the vehicle location information and the road information, the links traveled (traversed) by the vehicle in exiting the branch point. In the history information generation step the vehicle location recognition apparatus generates, on the basis of the link or links determined in the link determination step, travel history information representing a route (links) traveled by the vehicle exiting the branch point. In the history information storage step the vehicle location recognition apparatus stores, in a history information storage unit, the generated travel history information. In the learning step the vehicle location recognition apparatus generates, on the basis of the travel history information stored in the history information storage unit, learned priority information representing the priorities (frequency of travel) of the respective links used (searched) in the link determination step, i.e. the links of the roads connecting at the branch point.

In accordance with the foregoing program executed by the vehicle location recognition apparatus, information for the route traveled by the vehicle in the past, at the branch point, can be appropriately collected and stored as the travel history information. Further, on the basis of the thus stored travel history information, the learned priority information is generated which represents the priorities of the respective links used in the determination of the links traveled by the vehicle. Therefore, the determination in the link determination step reflects the result of learning of the route traveled by the vehicle in the past by use of the learned priority information. Accordingly, even if it is difficult to determine the links of a road being traveled by the vehicle solely from the vehicle location information and the road information obtained by GPS positioning or the autonomous navigation, as at a narrow-angle branch point or the like, for example, the links traveled by the vehicle beyond (departing) the branch point can be accurately determined.

DESCRIPTION OF THE PREFERRED EMBODIMENTS

Figure 1:
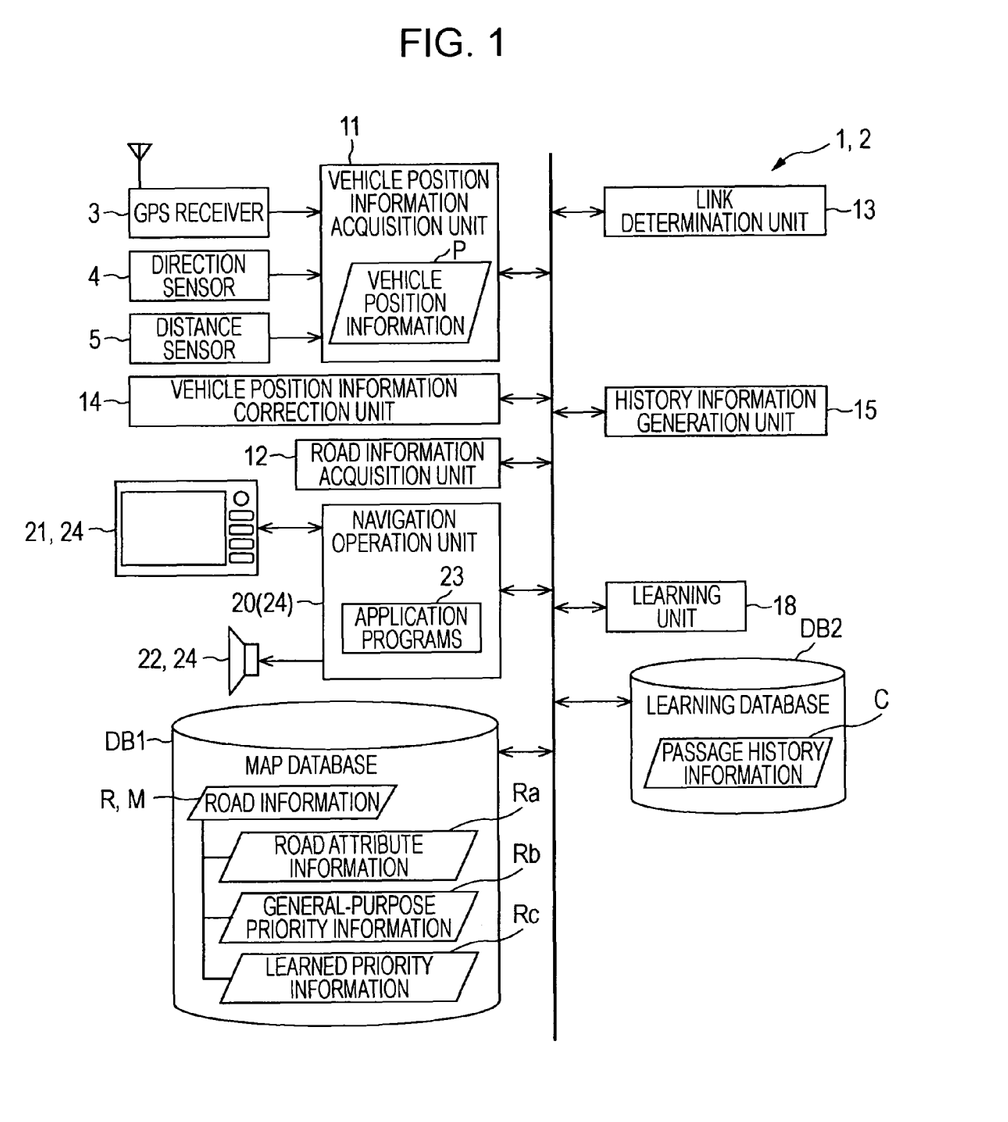
FIG. 1 is a block diagram illustrating a vehicle location recognition apparatus according to an embodiment of the present invention.

An embodiment of the present invention will now be described with reference to the drawings. FIG. 1 shows a navigation apparatus 1 as including a vehicle location recognition apparatus 2 in accordance with the present invention. The vehicle location recognition apparatus 2 provides a determination of which road, among a plurality of roads branching at a branch point, particularly a narrow-angle branch point, is traveled by the vehicle in departing the branch point and provides correction of vehicle location information P. On the basis of the corrected vehicle location information P, the navigation apparatus 1 executes navigation routines including route guidance.

The navigation apparatus 1 illustrated in FIG. 1 includes the functional units of the vehicle location recognition apparatus 2 such as a vehicle location information acquisition unit 11, a road information acquisition unit 12, a link determination unit 13, a vehicle location information correction unit 14, a history information generation unit 15, and a learning unit 18. The navigation apparatus 1 also includes a navigation operation unit 20. The respective functional units are either hardware or software (a program) or both and are configured to perform a variety of processes on input data, with an arithmetic processing unit such as a CPU (Central Processing Unit) or a DSP (Digital Signal Processor) functioning as a core member. Further, the respective functional units are configured to exchange information with one another. The navigation apparatus 1 further includes a map database DB1 storing map information and so forth and a learning database DB2. The map database DB1 and the learning database DB2 include, as hardware, a device including a recording medium capable of storing information and a drive unit for driving the recording medium, such as a hard drive, a DVD (Digital Versatile Disk) drive including a DVD-ROM (Read-Only Memory), and a CD (Compact Disk) drive including a CD-ROM, for example. As the recording medium, a medium rewritable or recordable as required is used. A detailed description of each of the components of the navigation apparatus 1 follows below.

Figure 2:
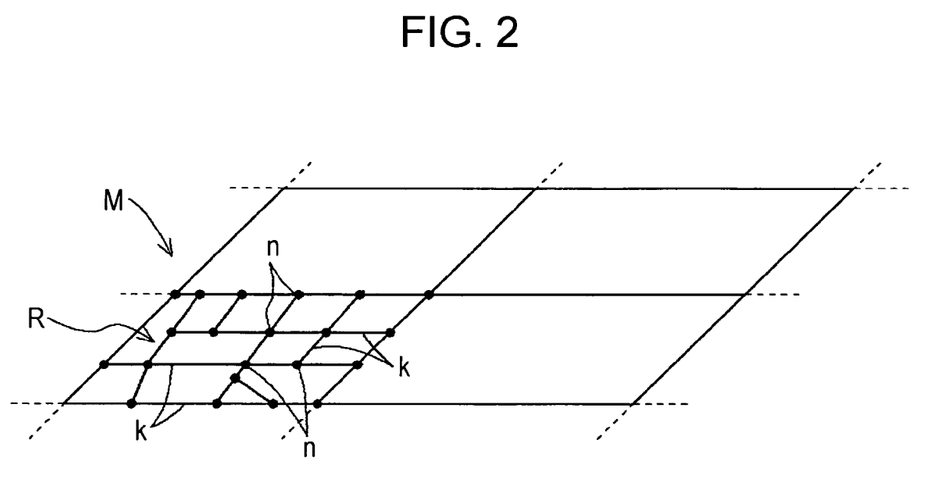
FIG. 2 is a diagram illustrating an example of the configuration (structure) of map information stored in a map database.

The map database DB1 is a database storing map information M divided into predetermined sections. FIG. 2 is a diagram illustrating an example of the configuration (structure) of the map information M stored in the map database DB1. As illustrated in FIG. 2, the map information M includes road information R representing a road network in the form of a multitude of nodes n, corresponding to intersections, and links k corresponding to roads connecting the respective intersections. The map information includes, for each of the nodes n, map coordinates represented by the latitude and the longitude. The respective links k connect the nodes n. Further, for each of the links k, the map information includes attribute information for the link, such as road type, link length, road width, and shape interpolation points representing the link shape. Herein, the road type information is that information which classifies each road as one of a plurality of types, such as car-only roads, town streets, narrow streets, and mountain roads, for example. The attribute information for the links k corresponds to road attribute information Ra in FIG. 1. The map database DB1 is a road information storage unit which stores road information in sections. FIG. 2 illustrates the road information R of only one section, with the road information R of the other sections omitted.

With reference to FIG. 1, the road information R includes general-purpose priority information Rb and learned priority information Rc, in addition to the road attribute information Ra. The general-purpose priority information Rb and the learned priority information Rc represent the priorities of the respective links k examined in the determination of the links k traveled by the vehicle beyond (departing) the narrow-angle branch point. The general-purpose priority information Rb represents the priorities set on the basis of the road attribute information Ra and so forth. A detailed description of the general-purpose priority information Rb follows. The learned priority information Rc represents the priorities set based on the results of learning by referring to the travel history of the vehicle. A detailed description of the learned priority information Rc also follows below.

The vehicle location information acquisition unit 11 acquires the vehicle location information P representing the current location of the vehicle. In the present embodiment, the vehicle location information acquisition unit 11 is connected to a GPS receiver 3, a direction sensor 4, and a distance sensor 5. The GPS receiver 3 is a device for receiving GPS signals from GPS satellites. The GPS signals are normally output and received every other second by the vehicle location information acquisition unit 11. The vehicle location information acquisition unit 11 analyzes the signals from the GPS satellites received by the GPS receiver 3 so as to acquire information such as the current location (the latitude and the longitude), the direction of travel, the travel speed of the vehicle, and the time. The direction sensor 4 is a sensor for detecting the direction of travel of the vehicle or a change in the direction of travel. The direction sensor 4 is, for example, a gyro sensor, a geomagnetic sensor, an optical rotation sensor installed on a rotary element of a steering mechanism, an angle sensor connected to a potentiometer or a wheel, and so forth. The direction sensor 4 outputs the detected values to the vehicle location information acquisition unit 11. The distance sensor 5 is a sensor for detecting the vehicle speed and the distance traveled by the vehicle. The distance sensor 5 is, for example, a vehicle speed pulse sensor for outputting a pulse signal every time a drive shaft or a wheel of the vehicle rotates by a predetermined amount, a yaw/G sensor for detecting the acceleration of the vehicle, a circuit for integrating the detected acceleration, and so forth. The distance sensor 5 outputs, to the vehicle location information acquisition unit 11, the information for the detected vehicle speed and travel distance. On the basis of the outputs from the GPS receiver 3, the direction sensor 4, and the distance sensor 5, the vehicle location information acquisition unit 11 determines the location of the vehicle in accordance with a known method, to thereby acquire the vehicle location information P.

The road information acquisition unit 12 acquires the road information R representing roads connected as a plurality of links k. The road information acquisition unit 12 acquires road information R for an area surrounding the detected vehicle location extracted from the map database DB1. The acquired road information R includes the road attribute information Ra, the general-purpose priority information Rb, and the learned priority information Rc. The road information acquisition unit 12 thereby functions as a road attribute information acquisition unit, a general-purpose priority information acquisition unit, and a learned priority information acquisition unit.

On the basis of the vehicle location information P and the road information R, the link determination unit 13 determines the links k traveled by the vehicle. The link determination unit 13 determines the links k traveled by the vehicle through a process similar to a conventional map matching process. As described in more detail later, the link determination unit 3 determines the link k traveled by the vehicle beyond the branch point of the links k by referring to the learned priority information Rc and the general-purpose priority information Rb.

On the basis of the results obtained by the link determination unit 13, the vehicle location information correction unit 14 executes a conventional map matching process to correct the vehicle location information P so that it aligns with the road, i.e., the link k represented by the road information R. Thereby, the vehicle location information P acquired by the vehicle location information acquisition unit 11 is corrected to coincide with the vehicle location information P including the information for the current location of the vehicle, represented by latitude and the longitude, and the information for the direction of travel of the vehicle.

The navigation operation unit 20 is a unit which executes application programs 23 to provide navigation functions such as the display of the vehicle location, the search for a route from the place of departure to the destination, guidance along the route to the destination, and search for the destination. For example, the navigation operation unit 20 acquires, from the map database DB1, the map information M for the area surrounding the vehicle (vicinity of the vehicle) on the basis of the vehicle location information P, displays an image of a map on a display input device 21, and superimposes a display of a vehicle location mark (symbol) on the map image, all based on the vehicle location information P. Further, the navigation operation unit 20 searches for a route from a place of departure to the destination on the basis of the map information M stored in the map database DB1. Further, on the basis of the route located by search, from the place of departure to the destination, and the vehicle location information P, the navigation operation unit 20 provides the driver with guidance along the route by using either one or both of the display device 21 and audio output device 22. In the present embodiment, the navigation operation unit 20 is connected to the display/input device 21 and the audio output device 22. The display/input device 21 is a display device, such as a liquid crystal display, in combination with an input device such as a touch panel. The audio output device 22 includes a speaker and so forth. In the present embodiment, the navigation operation unit 20, the display/input device 21, and the audio output device 22 function as the guidance information output unit 24.

Figure 3:
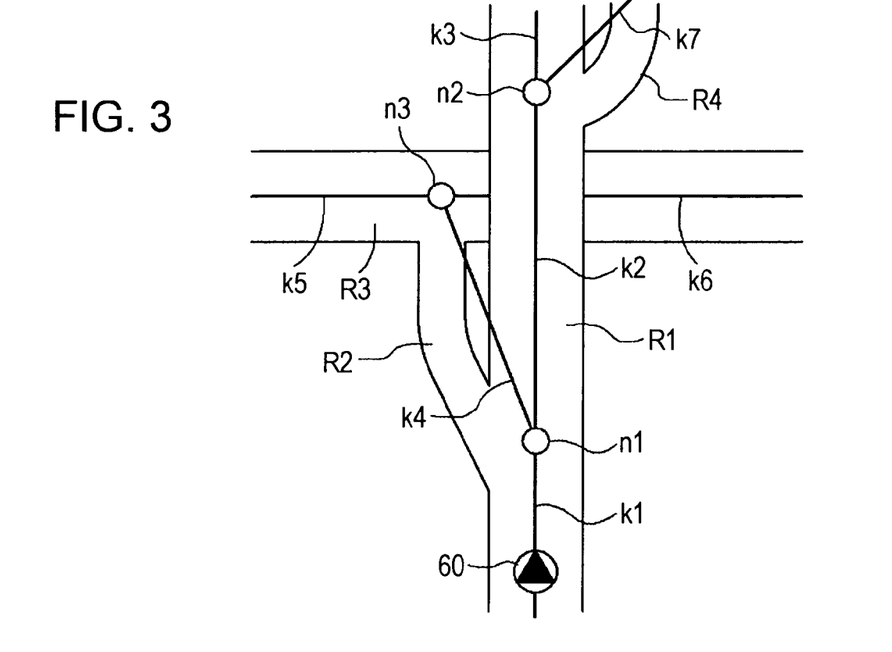
FIG. 3 is a diagram illustrating a narrow-angle branch point and road information for the roads connecting at the branch point.

FIG. 3 is a diagram illustrating a road including a narrow-angle branch point and showing the road information for the road. In the drawing, n1 to n3, k1 to k7, and R1 to R4 indicate the nodes n, the links k, and roads R corresponding to the links k1 to k7, respectively. The road R1 is a major road and has a narrow-angle branch point at the node n1. The road R2 is a branch road branching from the road R1 and extending along the road R1 as a side road (access road). At the node n3, road R2 is connected to the road R3 which is a major road perpendicular to the road R1. A vehicle location mark 60 is displayed on the display/input device 21. The vehicle location mark 60 indicates that the vehicle is moving toward the node n1, which represents the narrow-angle branch point. The narrow-angle branch point is a branch point where roads connect at a small angle which makes it difficult for a direction sensor to detect a change in the course, i.e., an angle of 45 degrees or less.

Figure 4:
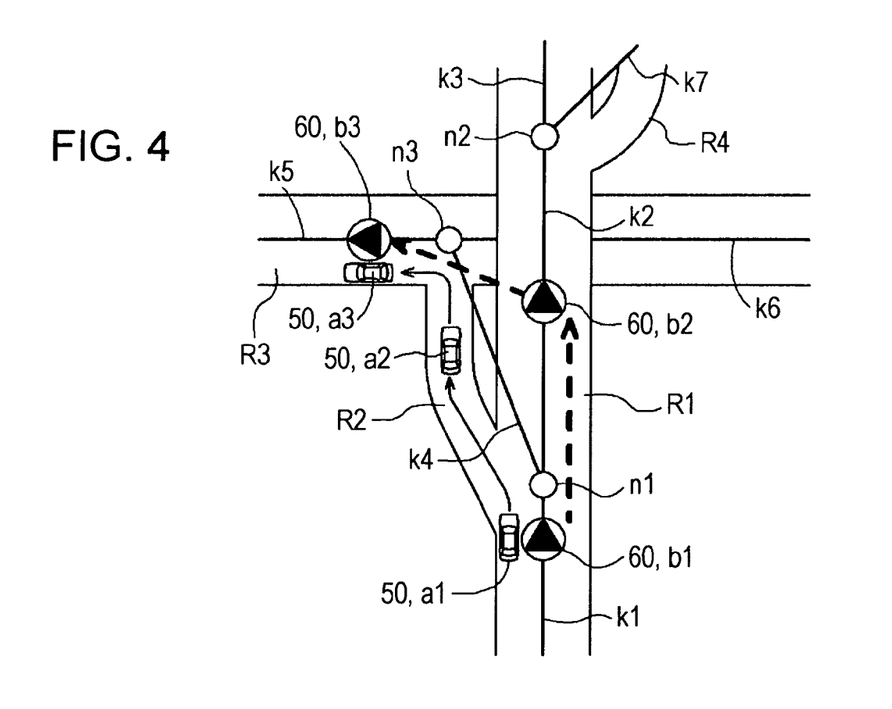
FIG. 4 is a diagram illustrating travel history for a road in FIG. 3.

The history information generation unit 15 generates, on the basis of the links k determined by the link determination unit 13, travel history information C for the route taken by the vehicle at the branch point of the links k. FIG. 4 illustrates the travel history for the road of FIG. 3. FIG. 4 shows a vehicle 50 traveling along the road R1 and transitioning onto the road R3 via the road R2, which is the branch road. The vehicle 50 at location a1 on the road R1 is correctly mapped on the link k1 corresponding to the road R1. Accordingly, the vehicle location mark 60 is displayed at a location b1 on the link k1. However, when the vehicle 50 reaches location a2 on the road R2 extending along the road R1, the vehicle 50 may be mapped, not on the link k4 corresponding to the road R2, but on the link k2 corresponding to the road R1. Further, the vehicle location mark 60 may be erroneously displayed at a location b2 on the link k2. The vehicle 50 at a location a3 on the road R3 is mapped on the link k5 corresponding to the road R3 by a correct link determination and the vehicle location mark 60 is displayed at a location b3 on the link k5.

In the above scenario, the locations a1 to a3 of the vehicle 50 and the locations b1 to b3 of the vehicle location mark 60 displayed on the display/input device 21 are representative points. The link determination and the display of the vehicle location mark 60 are actually performed at shorter intervals. In the above-described example, the route constituted by the links k and determined by the link determination unit 13 is expressed as a link sequence "k1→k2→k5" in accordance with the order of determination. From FIGS. 3 and 4, it can be understood that the links k2 and k5 are not in a connecting relationship with each other in the road information R. Thus, a so-called "jump in location" occurs from the link k2 to the link k5. The jump in location indicates that the display of the vehicle location mark 60 on the display/input device 21 will be discontinuous, possibly confusing the driver.

To enable correct link determination, therefore, the vehicle location recognition device 2 in the present embodiment generates travel history information C based on the travel history of the vehicle, and generates the learned priority information Rc on the basis of the generated travel history information C. In other words, based on the route of the links k determined by the link determination unit 13, the history information generation unit 15 generates the travel history information C.

The travel history information C can be irrelevant to the actual travel route of the vehicle 50 if representing the route of the links k in the order of the links k determined by the link determination unit 13. For instance, in the example of FIG. 4, the route, i.e., the link sequence "k1→k2→k5", is generated as the travel history information C (C1). For example, as illustrated in FIGS. 3 and 4, route-representing link sequences "k1→k4→k5," "k1→k2→k3," and "k1→k4→k3" are alternative possibilities for the travel history information C (C2, C3, and C4, respectively).

The travel history information C2 is generated when a route from the road R1 to the road R3 via the road R2 is represented by the link sequence resulting from a correct link determination. The travel history information C3 is generated when a route straight along the road R1, without a change in the course at the branch point, is represented as the correct link determination. The travel history information C4 is generated when the jump in location is in a direction different from the direction of the jump in location occurring in the link sequence represented by the history information C1.

The history information generation unit 15 stores a section of the route, of the links k determined by the link determination unit 13, extending across a predetermined storage section from the branch point, and generates the travel history information C on the basis of the stored route section for the links k. Herein, the predetermined storage section refers to, for example, a section in which a "jump in location" occurs as a movement from one of the links k to another link k not directly connected to the one link k. In the above-described example, the jump in location occurs in the travel history information for link sequences C1 and C4. In the link history information C1 (for the link sequence K1→K2→K5), the storage section corresponds to a travel route including the link k1 before the branch point, as the starting point, and extending to the link k5 in which the jump in location occurs. In the travel history information C4 (for the link sequence K1→K4→K3), the storage section corresponds to a travel route including the link k1 before the branch point, as the starting point, and extending to the link k3 in which the jump in location occurs.

Alternatively, the predetermined storage section can be a section extending to the next narrow-angle branch point in the direction of travel of the vehicle or a section having a predetermined number of links. This is because, upon arrival at the next narrow-angle branch point, the travel history information C needs to be generated for that narrow-angle branch point. Further, to determine the link k which completes the storage section, a link k where there is no jump in location, the storage section may be set for each branch point such that the section has a predetermined number of links counted from the branch point. It is preferred to set the predetermined number to be equal to or greater than the number of links to the link k in which the "jump in location" may occur. For instance, in the above-described example, if the predetermined number is set as three, with the link k1 before the branch point as the starting point, a travel route extending to the link k5 or to the link k3 would correspond to one storage section. Needless to say, the predetermined number may be set as four or more to improve the accuracy.

In the above example, the travel history information C is generated in accordance with the order of the links k determined by the link determination unit 13, independent of the actual travel route of the vehicle 50. Alternatively, the history information generation unit 15 may determine, on the basis of the links k determined by the link determination unit 13, the route actually traveled by the vehicle 50 at the branch point of the links k, and may generate the travel history information C representing the actually passed route.

For example, if the order of the links k determined by the link determination unit 13 is "k1→k2→k5," it is assumed that there is a movement from the link k2 to the link k5, although the links are not directly connected with each other in the road information R. Since the movement is considered to be a jump in location, the history information generation unit 15 determines that the actual travel route is "k1→k4→k5," and generates the thus determined route as the travel history information C.

The learning database DB2 functions as a history information storage unit for storing the travel history information C generated by the history information generation unit 15. The learning database DB2 calculates, for each branch point, the travel ratios for the travel routes extending from the branch point, i.e. the number of times a given route has been traveled relative to the total for all possible departure routes at the branch point. The results of the calculation are added to the stored database. For example, the travel history information C1 (k1→k2→k5), C2 (k1→k4→k5), C3 (k1→k2→k3), and C4 (k1→k4→k3) in the above-described example might have travel ratios of 70%, 20%, 8%, and 2%, respectively.

If the travel history information C is generated based on the routes actually traveled by the vehicle 50 (C12 and C13), the travel history information C12 (k1→k4→k5) and C13 (k1→k2→k3) have travel ratios of 90% and 10%, respectively.

On the basis of the travel history information C stored in the learning database DB2, the learning unit 18 generates the learned priority information Rc representing the priorities of the respective links k used in the determination of the links k traveled by the vehicle 50 beyond the branch point. On the basis of the travel history information C1 to C4 stored in the learning database DB2, the travel ratios for the links k2 and k4 branching at the branch point, i.e., the travel ratios of the routes k1→k2 and k1→k4, are 10% and 90%, respectively.

Thus, on the basis of the above travel ratios, the learning unit 18 generates the learned priority information Rc, which is the information representing the priorities for the links k2 and k4. In the above example, the learned priority information Rc is generated as coefficients 1.0 and 9.0 for the routes k1→k2 and k1→k4, respectively.

The learned priority information Rc generated by the learning unit 18 in the above-described manner is used in the determination by the link determination unit 13 of the links k traveled by the vehicle. Further, the result of the determination by the link determination unit 13 of the links k traveled by the vehicle is used in the correction of the vehicle location information P by the vehicle location information correction unit 14.

Figure 5:
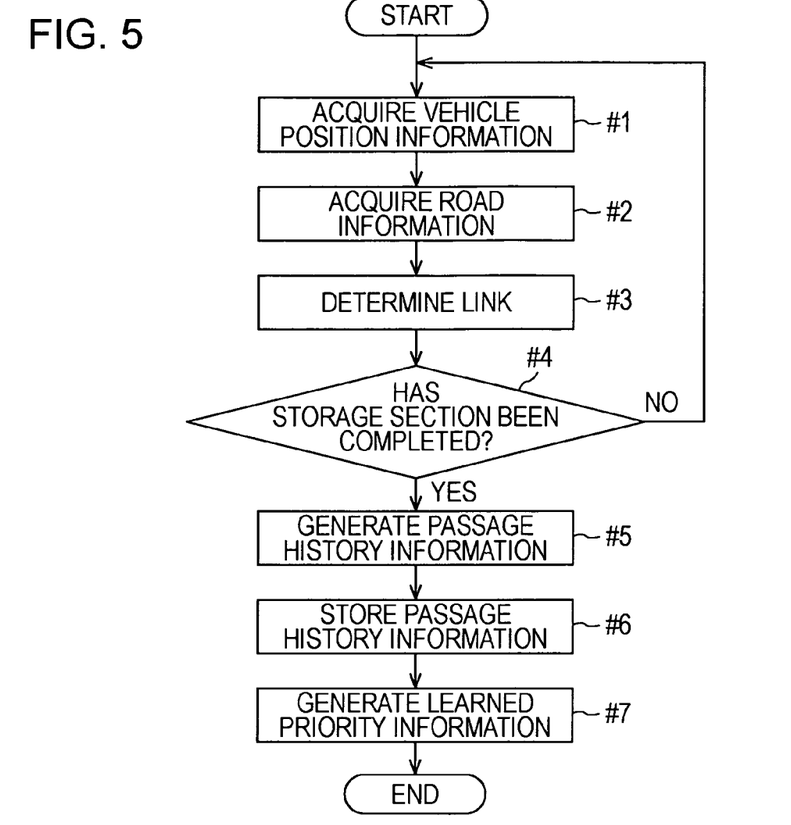
FIG. 5 is a flowchart of an embodiment of a vehicle location recognition process in accordance with the present invention.

With reference to the flowchart illustrated in FIG. 5, an embodiment of a method for vehicle location recognition, by the vehicle location recognition apparatus 2, will now be described. The description which follows assumes that the vehicle location recognition apparatus 2 has already recognized that the vehicle 50 has been traveling the link k1 as shown in FIGS. 3 and 4. The method of vehicle location recognition described below is execution by the respective functional units of the navigation apparatus 1, which units are in the form of hardware, software (a program) or both, with an arithmetic processing unit such as a CPU or a DSP functioning as the central unit. If the respective functional units are embodied in the form of a program (a vehicle location recognition program), the CPU or the DPS operates as a computer for executing the steps of the vehicle location recognition method.

Figure 6:
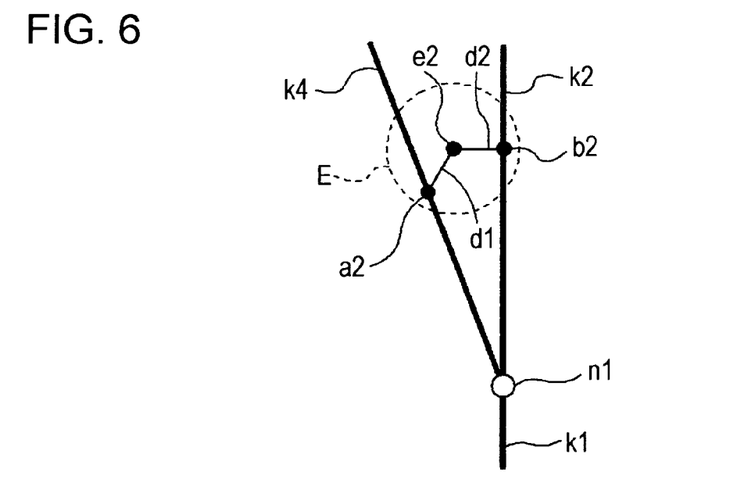
FIG. 6 is a diagram illustrating link determination at the narrow-angle branch point.

As described above, the vehicle location information acquisition unit 11 acquires the vehicle location information P (vehicle location information acquisition step: Step #1). Further, the road information acquisition unit 12 acquires the road information R (road information acquisition step: Step #2). On the basis of the acquired vehicle location information P and road information R, the link determination unit 13 determines the links k traveled by the vehicle 50 (Step #3). An example of the method for determining the links k is described below. FIG. 6 illustrates link determination at the narrow-angle branch point shown in FIGS. 3 and 4.

In the example illustrated in FIG. 6, the vehicle location information P, prior to correction by the vehicle location information correction unit 14, has the vehicle at e2. Further, the vehicle location information P has a margin of error over a range E. In this example, in which the vehicle location information P gives e2 as the current vehicle location, within the error range E are located both the link k2 representing the major road and the link k4 branching therefrom at the node n1 representing a narrow-angle branch point. Therefore, the link determination unit 13 will determine the links k traveled by the vehicle 50 on the basis of the general-purpose priority information Rb and coefficients D representing distances d1 and d2 from e2 to the links k4 and k2, respectively. For purposes of illustration, it will be assumed here that, for example, the coefficients D representing the distance d1 between e2 and the link k4 and the distance d2 between e2 and link k2 are both calculated to be 5.8 by the link determination unit 13. The road information R acquired by the road information acquisition unit 12 includes the general-purpose priority information Rb representing the priorities of the links k at such a branch point. The general-purpose priority information Rb is the information for the attributes of the roads and represents the priorities of the respective links k used in identifying the links k traveled by the vehicle 50, i.e. the route taken by the vehicle at route 1. It is preferred that the general-purpose priority information Rb represents the priorities of the respective links k determined in accordance with the probabilities of travel by the vehicle 50, based on general conditions, such as the road type and the road width, included in the attribute information of the respective links k. As illustrated in FIGS. 3 and 4, if the road R1 represented by the link k2 is a major road and the road R2 represented by the link k4 is a side road, the general-purpose priority information Rb has coefficients of 8.0 and 2.0, for example, for the links k2 and k4, respectively. Using the coefficients D of the distances d1 and d2 to the links k4 and k2 and the general-purpose priority information Rb, the link determination unit 13 calculates the probability of travel of the links k2 and k4 as D×Rb=5.0× 8.0=40.0 and D×Rb=5.0×2.0=10.0, respectively.

As described above, the probability (degree of correspondence) is higher for the link k2 than for the link k4 actually traveled by the vehicle 50. Therefore, the link determination unit 13 determines that the link k traveled by the vehicle 50 is the link k2.

Then, the history information generation unit 15 determines whether or not the predetermined storage section for generating the travel history information C has been completed (Step #4). As described above, the predetermined storage section is, for example, (1) a section in which a "jump in location" occurs as a movement from one of the links k to another link k not directly connected to that one link k in the road information R, or (2) a section extending to the next narrow-angle branch point in the direction of travel of the vehicle. The link sequence represented by the travel history information C which would be generated here is "k1→k2." Because the link sequence here does not meet either of the above-described criteria for a complete storage section, the history information generation unit 15 determines "NO" at Step #4. Steps #1 to #4 described above are repeated until a predetermined storage section (meeting one of the two criteria) is completed.

When the vehicle 50 has reached the location a3 illustrated in FIG. 4, the links included within the error range E are reduced to k5. Thus, as a result of a link determination similar to the above-described link determination, the link k traveled by the vehicle 50 is determined to be link k5. Here, because the links k2 and k5 are not connected to each other, there is a "jump in location" between these links k. Thus, the history information generation unit 15 determines that the storage section is "complete" due to the jump in location (Step #4), and generates a link sequence expressed as "k1→k2→k5" as the travel history information C (Step #5). The generated travel history information C may be either the link sequence representing the order of the links k determined as described above or the link sequence representing the actual route. In the present example, the travel history information C is generated independent of the actual travel route, as the link sequence represented by links k in the order determined by the link determination unit 13. Step #5 and/or Step #4 represent the history information generation step in the method of the present invention.

The generated travel history information C is stored in the learning database DB2 (a history information storage step: Step #6). The travel history information C is stored and accumulated as the above-described steps are repeated each time the vehicle 50 passes through the same branch point. By repeated travel through the same branch point, information for the link travel ratios for the vehicle 50 is created in the learning database DB2. For example, the travel history information C1 (k1→k2→k5), C2 (k1→k4→k5), C3 (k1→k2→k3), and C4 (k1→k4→k3) might have travel ratios 70%, 20%, 8%, and 2%, respectively.

On the basis of the travel history information C1 to C4, the learning unit 18 generates the learned priority information Rc representing the priorities of the respective links k used by the link determination unit 13 in determining the link k traveled by the vehicle 50 at the branch point (a learning step: Step #7). On the basis of the travel history information C1 to C4 stored in the learning database DB2, the link travel ratios of the vehicle 50 for each of the plurality of links k2 and k4 branching from the branch point are determined for the routes k1→k2 and k1→k4 as, for example, 10% and 90%, respectively.

On the basis of the link travel ratios, the learning unit 18 generates the learned priority information Rc, which represents the priorities for the links k2 and k4. In the above-described example, the learned priority information Rc is generated as coefficients 1.0 and 9.0 for the routes k1→k2 and k1→k4, respectively.

After the learning process, i.e., after the generation of the learned priority information Rc, the link determination is performed as follows when the vehicle 50 travels through that branch point for which the learned priority information Rc has been generated, as illustrated by way of example in FIG. 6. The coefficients D of the distances d1 and d2 to the links k4 and d2 and the general-purpose priority information Rb are similar to those in the above-described example. That is, the coefficients D of the distances d1 and d2 are represented as d1=d2=5.0, and the general-purpose priority information Rb has coefficients 8.0 and 2.0 for the routes k1→k2 and k1→k4, respectively. Using the coefficients D of the distances d1 and d2 to the links k4 and k2, the general-purpose priority information Rb, and the learned priority information Rc, the link determination unit 13 calculates the degrees of correspondence to the links k2 and k4 (probabilities) as D×Rb× Rc=5.0×8.0×1.0=40.0 and D×Rb×Rc=5.0×2.0×9.0=90.0, respectively.

As described above, the degree of correspondence for the link k4 actually traveled by the vehicle 50 is higher than that for the link k2. Therefore, the link determination unit 13 determines that the link k traveled by the vehicle 50 is k4.

In the above-described example, the learned priority information Rc is used in addition to the general-purpose priority information Rb. Alternatively, in other embodiments, the determination can also be made using the learned priority information Rc instead of the general-purpose priority information Rb. In such an embodiment, the degrees of correspondence of the links k2 and k4 are calculated as D×Rc=5.0× 1.0=5.0 and D×Rc=5.0×9.0=45.0, respectively.

As described above, if the learned priority information Rc based on the travel history information C is taken into consideration, an accurate determination can be made even at a narrow-angle branch point at which it is difficult to make the determination solely on the basis of GPS signals, for example.

Further, the learned priority information Rc specifies the priorities. For example, it is assumed that the vehicle 50 is traveling on the link k2, and that the distance coefficients D of the links k2 and k4 obtained by the positioning are 7.0 and 3.0, respectively.

Applying the coefficients D of the distances d1 and d2 to the links k4 and k2, the general-purpose priority information Rb, and the learned priority information Rc, the degrees of correspondence of the links k2 and k4 are calculated as D×Rb×Rc=7.0×8.0×1.0=56.0 and D×Rb×Rc=3.0×2.0×9.0=54.0, respectively.

As described above, the degree of correspondence is higher for the link k2 actually traveled by the vehicle 50 than that for in the link k4. Even with the use of learned priority information Rc, therefore, if the result of location determination is definite, the link determination unit 13 determines that the link k traveled by the vehicle 50 is the link k2.

In the above-described embodiment, the link determination is always made with the use of the learned priority information Rc. However, alternatively, if the result of location detection enables a relatively definite link determination, the learned priority information Rc can be excluded from consideration. That is, if it is possible to acquire a relatively accurate positioning, the possibility of erroneous matching caused by the influence of the learned priority information Rc can be avoided. Particularly, if the determination is made with the use of the learned priority information Rc instead of the general-purpose priority information Rb, the influence of the learned priority information Rc is substantially increased in the calculation of the degrees of correspondence, as described above. In such a case, it is preferred to select whether or not to apply (factor in) the learned priority information Rc, based on the results of positioning, i.e., the relationship between the links k and the accuracy of the vehicle location information P at the location for which the link determination is made.

As described above, the present embodiment provides a vehicle location recognition apparatus capable of accurately determining the link traveled by a vehicle beyond a branch point, particularly a narrow-angle branch point.

Other embodiments: (1) In the above-described embodiment the road information R stored in the map database DB1 includes both general-purpose priority information Rb and learned priority information Rc. However, the present invention is not so limited. That is, the general-purpose priority information Rb may be the information generated by the general-purpose priority information acquisition unit on the basis of the road attribute information Ra each time the link determination unit 13 determines a link k traveled by the vehicle 50. In the above-described embodiment, the road information acquisition unit 12 functions as a general-purpose priority information acquisition unit. However, the present invention also includes embodiments wherein the general-purpose priority information Rb is generated on the basis of the road attribute information Ra. Alternatively, the link determination unit 13 may be configured to function as the general-purpose priority information acquisition unit. Further, the learned priority information Rc may be, instead of the information generated by the learning unit 18 and previously stored in the map database DB1, information generated by the learning unit 18 on the basis of the travel history information C stored in the learning database DB 2, each time the link determination unit 13 determines the link k traveled by the vehicle 50.

(2) In the above-described embodiment, the learned priority information Rc and the general-purpose priority information Rb are used to set priorities for the respective links k used in the determination of the link k traveled by the vehicle 50; however, the present invention is not limited is such embodiments. Alternatively, the priorities of the respective links k may be determined without use of either the learned priority information Rc or the general-purpose priority information Rb. For example, in other embodiments, if the route to the destination has been set by the navigation operation unit 20, the links k traveled by the vehicle 50 may be determined using set route priority information in which the priorities of those links k extending along the route are increased relative to links not part of the set route.

The present invention can be incorporated into a navigation apparatus or the like, which can then used as a vehicle location recognition apparatus in accordance with the present invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A vehicle location recognition apparatus comprising:
a vehicle location information acquisition unit for acquiring vehicle location information representing a current location of a vehicle;
a road information acquisition unit for acquiring road information representing connecting roads, each road being represented by a plurality of links;
a link determination unit for determining, on the basis of vehicle location information links actually traveled by the vehicle through the branch point by use of learned priority information;
a history information generation unit for generating, on the basis of the links determined by the link determination unit to have been traveled by the vehicle, travel history information representing a route traveled by the vehicle in passing through a branch point of the links, the history information generation unit storing the links of the route traveled by the vehicle in passing through the branch point and extending from the branch point through a predetermined storage section and, if the stored route includes a jump in location which occurs as a movement from one of the links to another link not connected directly to the one link in the road information, uses the links actually traveled by the vehicle through the branch point to generate travel history information representing the determined actually traveled links;
a history information storage unit for storing the travel history information generated by the history information generation unit; and
a learning unit for generating, on the basis of the travel history information stored by the history information storage unit, the learned priority information, which is determined on the basis of the travel history information and which represents priorities determined on the basis of ratios for the number of times each one of the plurality of links branching at the branch point has been traveled by the vehicle relative to the total number of times all of the plurality of links have been traveled by the vehicle.

2. The vehicle location recognition apparatus according to claim 1, further comprising:
a general-purpose priority information acquisition unit for acquiring general-purpose priority information based on road attributes and representing the priorities of the respective links used in the determination by the link determination unit, wherein the link determination unit determines the link traveled by the vehicle in departing the branch point based on at least one of the learned priority information and the general-purpose priority information.

3. The vehicle location recognition apparatus according to claim 1, wherein the vehicle location information acquisition unit corrects the vehicle location information based on the result of the determination by the link determination unit.

4. The vehicle location recognition apparatus according to claim 2, wherein the vehicle location information acquisition unit corrects the vehicle location information based on the determination by the link determination unit.

5. The vehicle location recognition apparatus according to claim 1, wherein the branch point of the links is a narrow-angle branch point.

6. The vehicle location recognition apparatus according to claim 1, wherein the history information generation unit generates the travel history information representing the actually traveled route in accordance with the order in which links are determined by the link determination unit.

7. The vehicle location recognition apparatus according to claim 1, wherein the storage section is a section of a map database with data links extending to a next branch point in the direction of travel of the vehicle.

8. A navigation apparatus comprising:
the vehicle location recognition apparatus according to claim 1;
a road information storage unit for storing the road information;
a plurality of application programs executed with reference to the vehicle location information recognized by the vehicle location recognition apparatus and the stored road information; and
a guidance information output unit for operating in accordance with the application programs to output guidance information.

9. A non-transitory computer-readable medium having, encoded thereon, a vehicle location recognition program for causing a computer to operate as a vehicle location recognition apparatus and to execute a routine comprising:
a vehicle location information acquisition step of acquiring vehicle location information representing a current location of a vehicle;
a road information acquisition step of acquiring road information representing connecting roads, each road being represented by a plurality of links;
a link determination step of determining, on the basis of the vehicle location information and the road information, links traveled by the vehicle;
a history information generation step of generating, on the basis of the links determined by to have been traveled by the vehicle, travel history information representing links traveled by the vehicle at a link branch point;
a history information storage step of storing in a history information storage unit, the travel history information generated by the history information generation step including links determined to have been traveled by the vehicle in passing through the link branch point; and
a learning step of generating, on the basis of the travel history information stored in the history information storage unit, learned priority information representing priorities of links used in the determination by the link determination unit and traveled by the vehicle at the branch point, said learning step including the steps of:
determining the learned priority information on the basis of the travel history information, the learned priority information representing priorities determined on the basis of ratios for the number of times each one of the plurality of links branching at the branch point has been traveled by the vehicle relative to the total number of times all links of the plurality of links have been traveled by the vehicle; and
determining the links actually traveled by the vehicle through the branch point by use of the learned priority information.

* * * * *